US010320857B2

(12) United States Patent
Nichols et al.

(10) Patent No.: US 10,320,857 B2
(45) Date of Patent: Jun. 11, 2019

(54) HYBRID SYNCHRONOUS/ASYNCHRONOUS MEANS FOR SHARING USER INTERACTIONS ACROSS MULTIPLE DEVICES

(75) Inventors: Jeffrey William Nichols, San Jose, CA (US); Heather Rachelle Wiltse, Bloomington, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2584 days.

(21) Appl. No.: 12/355,626

(22) Filed: Jan. 16, 2009

(65) Prior Publication Data
US 2010/0185951 A1 Jul. 22, 2010

(51) Int. Cl.
*H04L 29/06* (2006.01)
*H04L 29/08* (2006.01)
*H04N 7/15* (2006.01)
*H04L 12/18* (2006.01)

(52) U.S. Cl.
CPC .......... *H04L 65/4015* (2013.01); *H04L 67/02* (2013.01); *H04L 67/10* (2013.01); *H04L 12/1813* (2013.01); *H04L 12/1822* (2013.01); *H04N 7/15* (2013.01)

(58) Field of Classification Search
CPC . G06F 3/048; H04L 12/1813; H04L 12/1822; H04L 65/4015; H04L 67/02; H04L 67/10; H04N 7/15
USPC ....................................................... 715/753
See application file for complete search history.

(56) References Cited

U.S. PATENT DOCUMENTS

| 7,552,199 B2 * | 6/2009 | Pomerantz .................... 709/219 |
| 7,899,829 B1 * | 3/2011 | Malla .................. G06F 16/9562 707/741 |
| 8,201,098 B1 * | 6/2012 | Bollman ............. G06Q 10/107 715/751 |
| 2002/0038388 A1 * | 3/2002 | Netter ...................... G06F 9/451 719/318 |
| 2004/0261026 A1 * | 12/2004 | Corson ......................... 715/704 |
| 2006/0195786 A1 | 8/2006 | Stoen et al. |
| 2006/0242629 A1 * | 10/2006 | Ansari .................... H04L 67/02 717/136 |
| 2007/0294425 A1 | 12/2007 | Sobti et al. |
| 2008/0192732 A1 | 8/2008 | Riley et al. |
| 2008/0209075 A1 | 8/2008 | Shamma |
| 2008/0215976 A1 * | 9/2008 | Bierner et al. ................ 715/708 |
| 2008/0222295 A1 | 9/2008 | Robinson et al. |

(Continued)

OTHER PUBLICATIONS

Han et al.; "Web Splitter: A Unified XML Framework for Multi-Device Collaborative Web Browsing;" ACM Conference on Computer Supported Cooperative Work 2000; pp. 221-230.

(Continued)

*Primary Examiner* — Sherrod L Keaton
(74) *Attorney, Agent, or Firm* — Cantor Colburn LLP; Daniel Johnson

(57) ABSTRACT

In an aspect of the invention, a method of communication comprises: establishing an asynchronous communication stream between a first user and a second user; and sending clipped dynamic content from the second user to the first user via the asynchronous communication stream, the clipped dynamic content selected and extracted from a web page by the second user.

21 Claims, 9 Drawing Sheets

(56) References Cited

U.S. PATENT DOCUMENTS

2008/0256563 A1* 10/2008 Han ........................ G06F 9/542
719/329

OTHER PUBLICATIONS

Morris et al.; "SearchTogether: An Interface for Collaborative Web Search;" UIST '07: Proceedings of the 20$^{th}$ Annual ACM Symposium on User Interface Software and Technology; 2007; pp. 3-12.
International Search Report dated Jun. 2, 2010 for International Application No. PCT/EP2010/050326.

* cited by examiner

FIG. 7

HYBRID SYNCHRONOUS/ASYNCHRONOUS MEANS FOR SHARING USER INTERACTIONS ACROSS MULTIPLE DEVICES

BACKGROUND OF THE INVENTION

The present invention relates generally to the field of multi-modal communications, and more specifically, to real-time, collaborative interactions among users.

Browsing the web, as it is currently designed and practiced, tends to be an inherently individual task as the traditional setup of one display and one set of input devices does not lend itself to use by more than one person at a time. However, there are situations in which collaborative browsing would be desirable. For example, planning a trip, researching a topic, and showing another user how to perform a task usually requires sending links back and forth via e-mail, using remote desktop software; or simply looking over another's shoulder.

A person "on-the-go" may occasionally need to access certain information that can be retrieved by browsing the Internet, but may not be able to access the information if walking, driving, or is otherwise unable to spend the cognitive resources to do the browsing. Instead, the person might contact a user who is at a desktop computer and who has the cognitive resources perform the browsing task as a proxy. For a collaborative user having only a mobile communication device, collaborative browsing with a desktop user can be advantageous when the complexity of a particular collaborative task might overwhelm the resources of the mobile device.

The browsing task might involve obtaining directions to a location or checking an e-mail for a piece of critical information. The mobile worker might need to obtain information from a home office and may rely on a family member to send the information to the mobile device. This information may be of a technical nature and may later be used for reference, requiring a log of such information requests to be maintained. Or, the mobile worker may need to fill data into a web form based on information provided by a customer using a phone. In some cases, there may be a need to share aspects of the data entry process so that the customer can actively participate, provide better answers, and correct mistakes.

In the present state of the art, such tasks comprise a primarily one-sided collaboration carried out entirely over a voice channel. In some situations, the mobile user may need to give up some confidential information, such as a password, in order for the desktop user to accomplish the browsing task. As mobile user gives instructions, the desktop user describes results appearing on a display—a process which typically leads to errors and frustration. The result of the collaborative interaction may further require the mobile user to either remember or to write down complex information, such as directions or phone numbers.

A number of systems have been designed to support collaborative web browsing or searching. Many of these are highly synchronous, with all participants viewing the display of one machine and sharing access to the keyboard and mouse pointer. One of the most common is Remote Desktop, developed by Microsoft, that allows a local user to control a remote computer. Other approaches have been designed more specifically for collaborative web work. For example, in the technical paper "GroupWeb: A WWW Browser as Real Time Groupware" by Greenberg et al., a browser is disclosed that allows group members to visually share and navigate World Wide Web pages in real time. A presentation tool is designed for real time distance education and conferencing, and provides for gesturing through pointers and annotations.

Other work has focused specifically on improving users' abilities to collaborate on web search tasks. A common overall approach is to allow users to use a divide-and-conquer strategy through splitting up web pages. One example of this is disclosed in the technical paper "WebSplitter: A Unified XML Framework for Multi-Device Collaborative Web Browsing" by Han et al. which splits a web page among multiple devices so as to deliver a different partial view of a web page to each of multiple users.

A system described in the technical paper "SearchTogether: An Interface for Collaborative Web Search" by Morris et al. takes a more comprehensive approach in supporting both synchronous and asynchronous collaborative web searching. The system provides awareness of other users' search terms and history of visited pages, mechanisms for division of labor in searching, and shared storage and annotation of search sessions.

Therefore, there is a need for a method that facilitates collaborative interactions among users, where one or more users may be accessing a communication device.

SUMMARY

In one aspect, the present invention comprises a method of: establishing an asynchronous communication stream between a first user and a second user; and sending clipped dynamic content from the second user to the first user via the asynchronous communication stream, the clipped dynamic content selected and extracted from a web page by the second user.

In another aspect of the present invention, a computer-implemented method for asynchronous communication between a first user and a second user comprises: establishing an asynchronous chat stream between the first user and the second user; providing a web page to a first user computer and to a second user computer; providing computer code to enable the first user to clip dynamic content from the web site and to send the clipped dynamic content to the second user; sending a textual representation of the web page interaction from the first user to the second user; and storing the textual representation.

In a further aspect of the present invention, a computer system for providing collaborative communication between a first user and a second user comprises: a server in asynchronous communication with a computer having an instant messaging module, the computer further having a macro recorder for recording a script of commands providing a return to a desired web page accessed by the first user, the computer further having means to clip dynamic content from the web page; a communication device in communication with the server, the communication device capable of instant messaging communication with the computer via the server such that the computer can send the recorded script of commands to the communication device.

In still another aspect of the present invention, a method comprises: providing a web page to a first communication device accessed by a first user; providing the web page to a second communication device accessed by a second user; providing to the first and the second communication devices a software application having a capability to record, automate, and share with the users processes performed in a web browser; establishing an asynchronous communication stream between the first communication device and the second communication device; and replicating a web page interaction executed in the first communication device as a web page interaction displayed in the second communication device.

These and other features, aspects and advantages of the present invention will become better understood with reference to the following drawings, description and claims.

BRIEF DESCRIPTION OF THE DRAWINGS

FIG. 7 is a diagrammatical illustration of a screen display including a user web page and chat page, in accordance with an alternative exemplary embodiment of the present invention;

FIG. 8 is a diagrammatical illustration of a chat page screen display for a mobile communication device, in accordance with an alternative exemplary embodiment of the present invention; and.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention provide a method of executing a collaborative web browsing session that uses a communication model of an instant messaging service to support a variety of collaborative browsing tasks between users accessing computers or other communication devices. Exemplary embodiments of the present invention provide users a method to initiate a collaborative browsing session by opening a chat session and interacting with their respective web browsers. User interactions include clipping and sending dynamic content, and may be recorded in natural language descriptions for access by other users via the chat channel.

Figure 1:
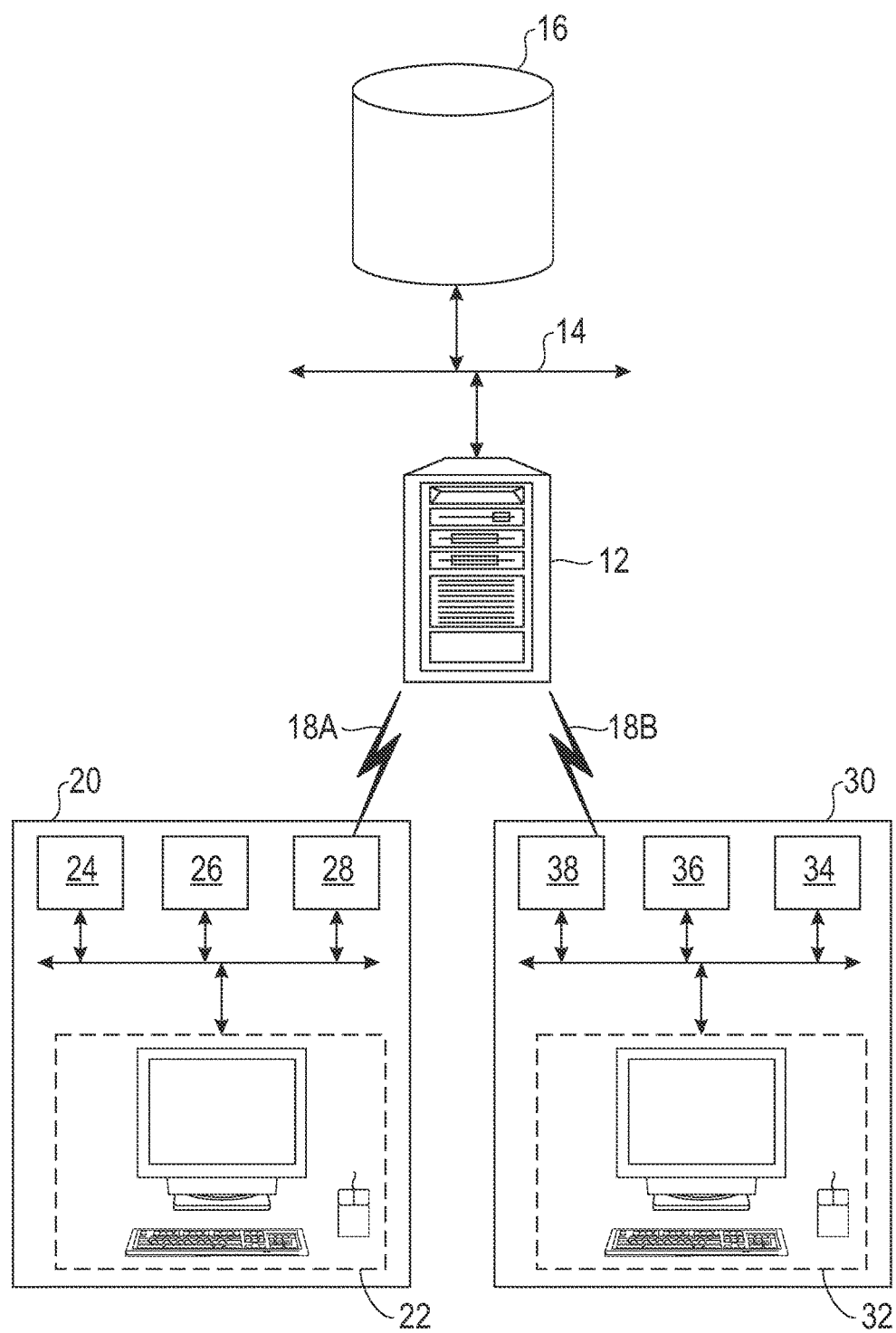
FIG. 1 is a diagrammatic illustration of a network architecture adaptable for sharing user interactions across multiple devices, in accordance with an exemplary embodiment of the present invention.

Referring to the drawings, FIG. 1 is a diagrammatical representation of a system 10 comprising computers 20 and 30 arranged in a peer-to-peer architecture. The computer 20 and the computer 30 may be in asynchronous communication with a server 12 via respective communication channels 18A and 18B. The server 12 may be coupled to a data storage unit 16 via a bus 14. The computer 20 may comprise a set of input/output devices 22, such as a keyboard, a mouse, a printer, and a display screen. The set of input/output devices 22 may be connected to a central processor unit (CPU) 24, an instant messaging (IM) module 26, and a macro recorder module 28. The computer 20 may likewise comprise a set of input/output devices 32 (e.g., a keyboard, a mouse, a printer, or a display screen). The set of input/output devices 32 may be connected to a CPU 34, an IM module 36, and a macro recorder module 38. The IM modules 26 and 36 include executable instructions to implement an instant messaging communication session, or chat session, between two or more parties across a communication network (not shown). In an alternative exemplary embodiment, one or both of the computers 20 and 30 may be replaced by mobile communication devices (not shown), such as a BlackBerry® or an iPhone™, as explained in greater detail below.

Figure 2A:
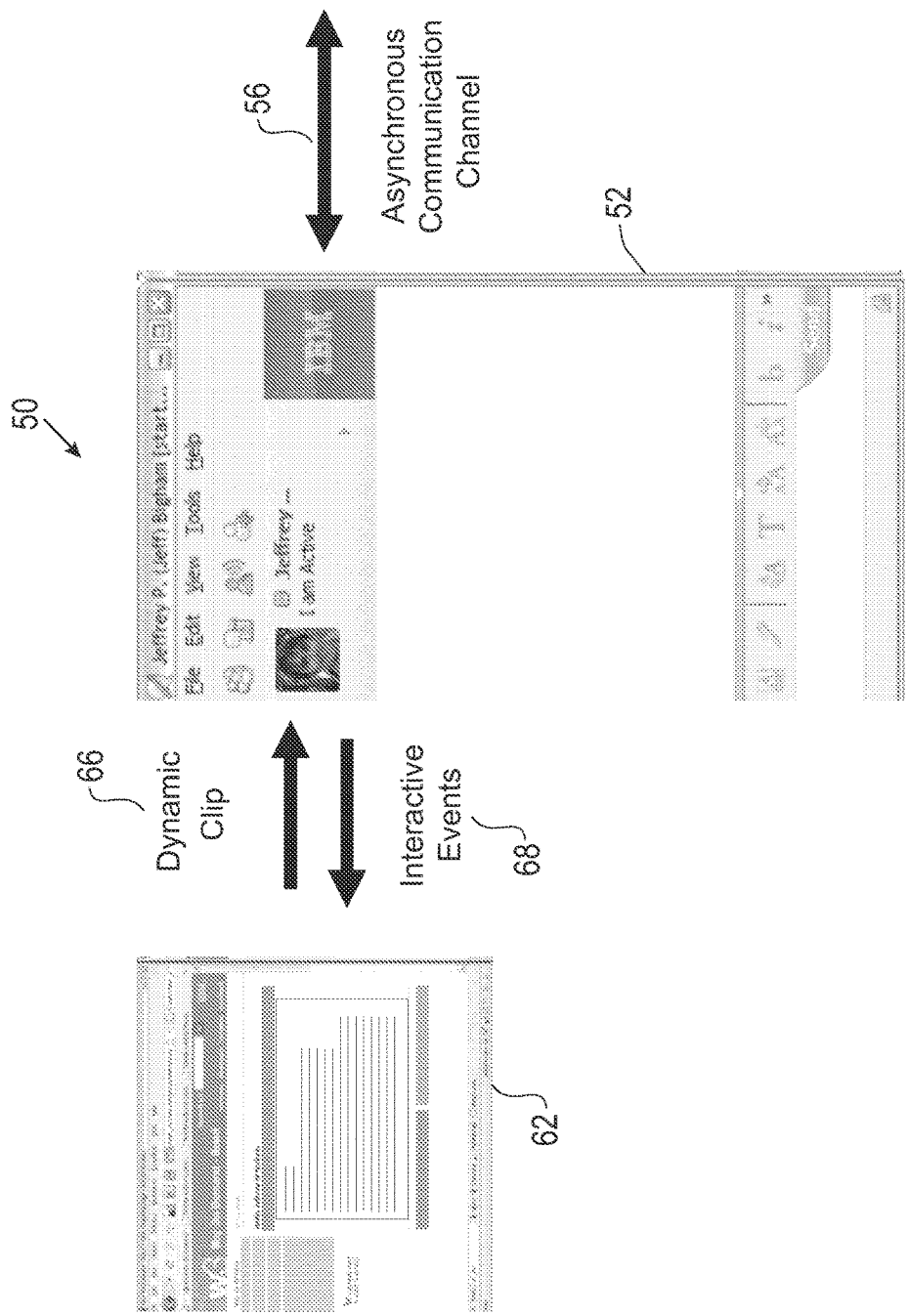
FIGS. 2A and 2B are a diagrammatical illustration of a collaborative browsing session with two users, the illustration showing user web pages and chat pages, in accordance with an exemplary embodiment of the present invention.
Figure 2B:
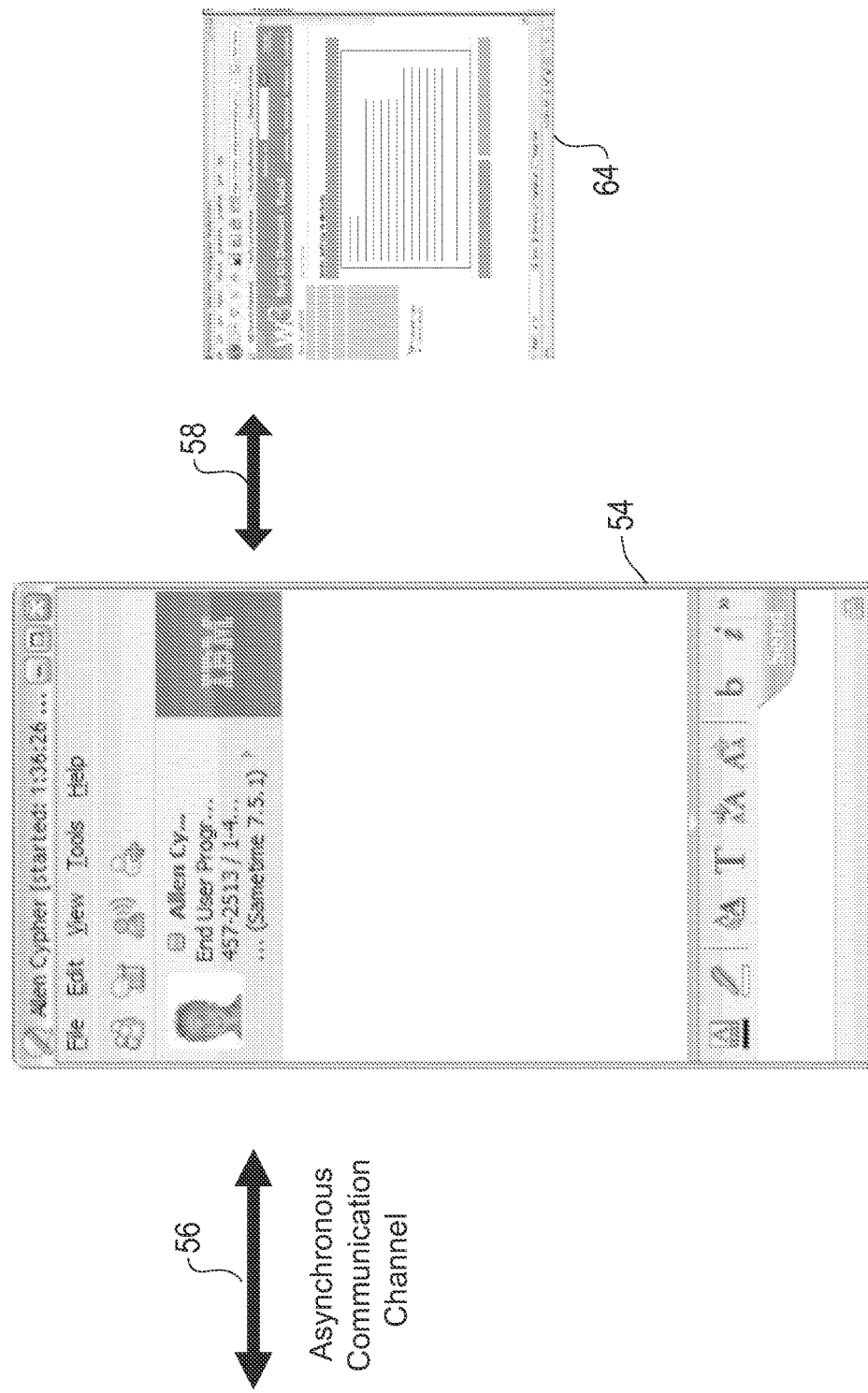

FIGS. 2A and 2B are a diagrammatical illustration of a collaborative chat session 50 conducted "in real time" between a local user at a computer or communication device, and a remote user at a computer or communication device, in accordance with an exemplary embodiment of the invention. The local user (not shown) has access to a local chat page 52 to open up an asynchronous communication channel 56 with the remote user (not shown) via an e-mail application or via an instant messaging (IM) system. The IM system can utilize a conventional instant messaging application such as provided by Sametime™, AOL Instant Messenger™, MSN Messenger, Yahoo™, and Google™. The remote user can respond to the local user by accessing the same IM application as the local user via a remote chat page 54. The local user may access a local web page 62 and thereby encounter an issue for which assistance from the remote user may be desired.

User interactions may be recorded in natural language descriptions and made available to other users via the asynchronous communication channel 56. Because the instant messaging chat stream links the local and remote users with a plurality of instant messaging clients, a user, or other client, can thus read along with what another user is doing without actually performing the interactions. Additionally, the user can double-check that the actions that will be performed are correct before executing them, and can later re-visit the chat log to interpret, and even re-execute, the steps that were taken previously. Distinct browser sessions may be used at all end points.

Figure 3A:
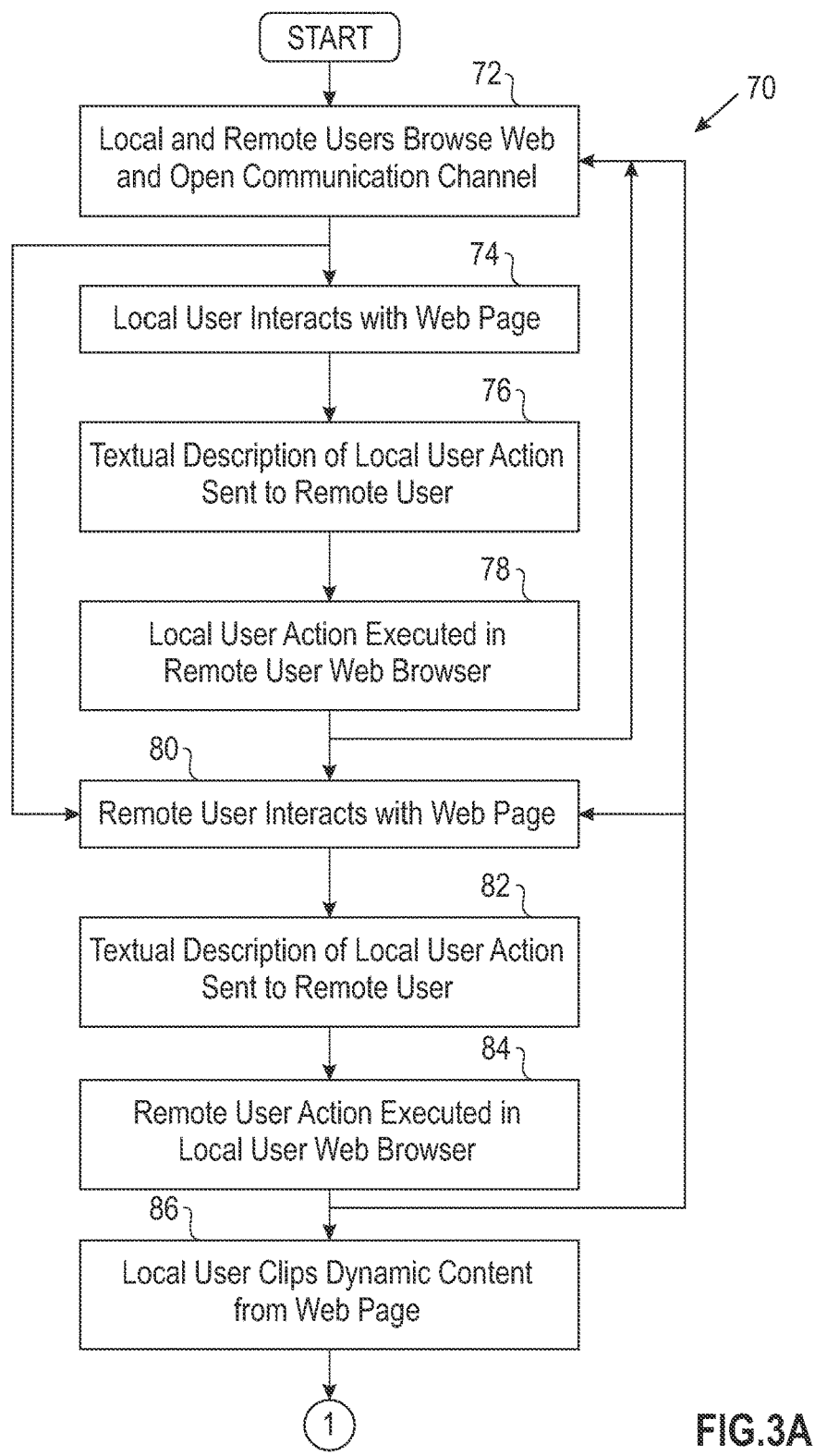
FIGS. 3A and 3B are a flowchart illustrating a method of collaborative browsing, in accordance with an exemplary embodiment of the present invention.
Figure 3B:
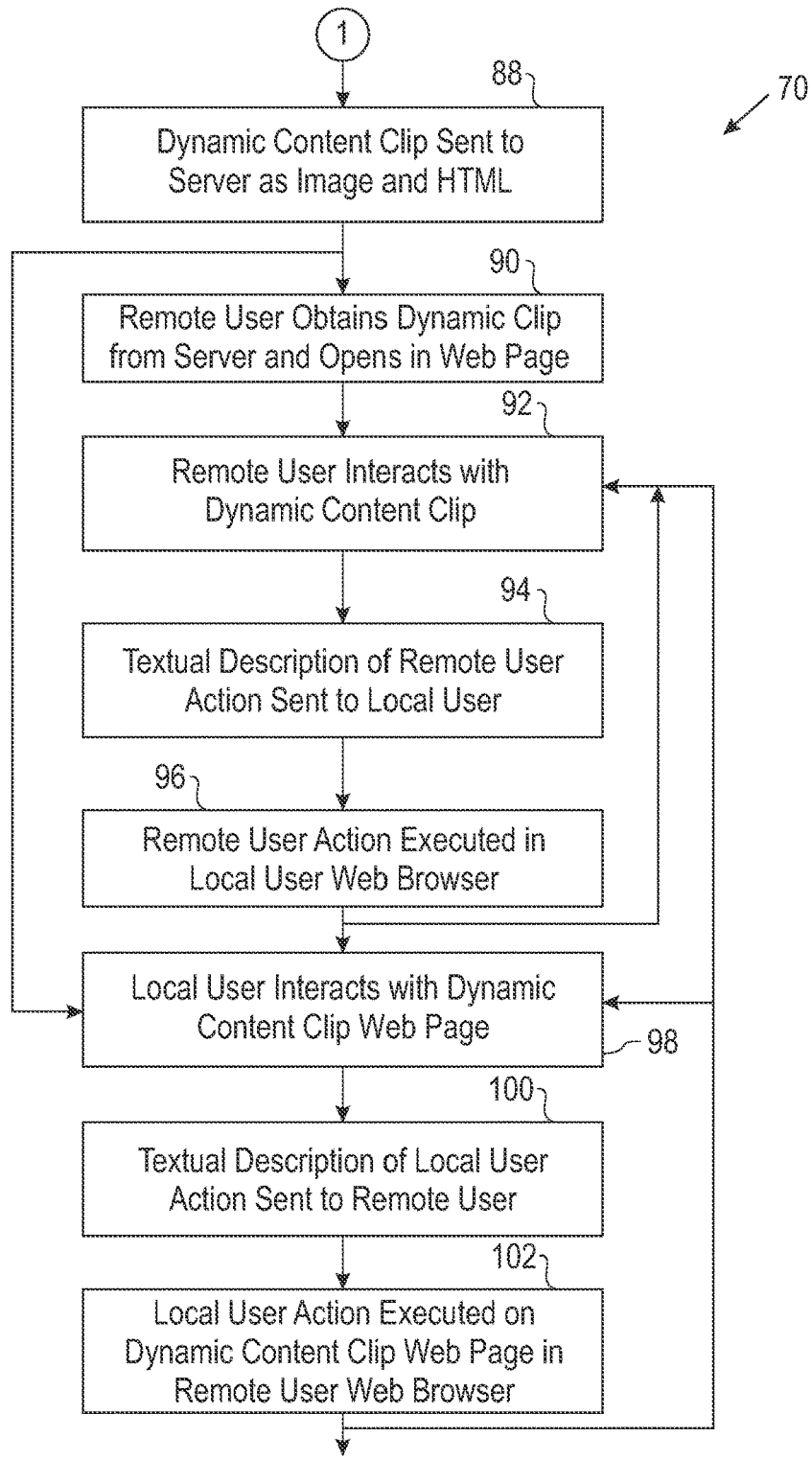

In an exemplary embodiment of the present method, illustrated by the flow chart 70 of FIGS. 3A and 3B, the local user and the remote user may establish the chat communication channel 16, between the local user and the remote user, at step 72, so as to provide an asynchronous communication stream between the local and remote users. In an exemplary embodiment, the asynchronous communication stream may be based on an IM application. The local user may access and interact with the local web page 62, at step 74, by means of a computer or other communications device. By "interact with" is meant that the local user performs an action causing one or more interactive events 68, such as scrolling or opening a popup window, that produces a data stream between the user and the associated web site in response to the action. A textual description of the action performed by the local user may be sent to the remote user, may also be stored via an IM chat stream, or may be sent to the data storage unit 16 (shown in FIG. 1), at step 76. Such actions recorded in the textual description may include, for example, a mouse event performed by the local user, a keyboard event executed by the local user, or a graphical change made to the computer system or computer display (e.g., computer 20 in FIG. 1) being used by the local user.

The action performed by the local user on the local web page 62 may also be replicated in the remote web page 64, at step 78, where the appearance of the remote web page 64 on the remote user display is substantially the same as the appearance of the local web page 62 on the local user display, as shown. The remote user may interact with the remote web page 64, via interactive events 58, at step 80, and thereby encounter the issue for which assistance is desired by the local user. A textual description of the action performed by the remote user may be sent to the local user and may also be stored in the IM chat stream, at step 82. The action executed on the remote web page 64 may be replicated on the local web page 22, at step 84.

The local user may clip dynamic content from the local web page 62 to obtain a dynamic clip 66 using tools available on the remote chat page 54, as explained in greater detail below, where the dynamic clip 66 contains information related to the issue for which assistance is desired, at step 86. As used herein, "dynamic content" means that HyperText Markup Language (HTML) code is included in the selected content. The clipped dynamic content (i.e., the dynamic clip 66) may be selected and extracted by the local user as a document object model (DOM) node for a web page, or as a bitmap image for other types of applications and sent over the chat communication channel 56 to the remote user.

A software application or computer code, such as CoScripter, having the capability to record, automate, and share among users processes performed in a web browser may be provided in the computers 20 and 30, or in the server 12. The software application or computer code may function to enable the respective users to clip dynamic content, that is, to perform a clipping function in a web page and form the dynamic clip 66, and to share web page interactions between users over the chat communication channel 56, with or without the sending of clipped dynamic content. For example, the local user may interact with a selected web page displayed on the local computer or communication device. This local user web page interaction may then be shared with the remote user at the remote communication device by transmittal over the chat communication channel 56. That is, the web page interaction may be replicated at the remote computer or communication device so as to appear on the same selected web page as displayed on the remote computer or communication device.

A simplified representation, such as a small image or an appropriate icon (not shown), may appear in the remote web page 64 to indicate to the remote user that the clipped dynamic content is available for interaction. The remote user then has the option to open the clipped dynamic content and then interact with the dynamic clip 66. If the clipped dynamic content originated in a web page, the remote user may open the dynamic clip 66 in a web browser. Some clipped content may be interactive directly within the remote web page 64, without requiring the remote user to open an additional application.

That is, as the two or more users interact with their respective browsers, the events and changes are communicated to the other users by sending additional messages. For example, if the remote user clicks within the received dynamic clip 66, an instant message may be sent to the local user saying: "click on <element> at <x, y>" where <element> would contain a reference that identifies the element clicked upon and the <x, y> would indicate where on that element the remote user had clicked. These messages may be recorded in chat history or a chat log, and may be shown in a chat window.

The local user may subsequently send the extracted dynamic clip 66 to a server (not shown) as an image with HTML coding included, at step 88. The remote user may click on an icon provided on the remote web page 64. The action of clicking on the icon may be used to initiate the transmittal of the clipped dynamic content from the server to the remote user computer or mobile communication device, at step 90, and may further open the clipped dynamic content in the web page on display. The remote user may interact with the dynamic clip 66, at step 92, and a textual description of the action performed by the remote user may be stored in the IM chat stream and may also be sent to the local user, at step 94. The actions performed by the remote user in the remote web page 64 may be replicated in the local web page 62, at step 96.

Accordingly, the local user may further interact with the clipped dynamic content appearing in the local web page 62, at step 98. A textual description of this subsequent action performed by the local user may be sent to the remote user and may also be stored in the IM chat stream and, at step 100. The action performed by the local user on the local web page 62 may also be replicated in the remote web page 64, at step 102. The collaborative chat session 50 may continue to step 92, where the remote user continues to interact with the clipped dynamic content, or may continue to step 98, where the local user continues to interact with the clipped dynamic content appearing in the local web page 62.

In an alternative exemplary embodiment, the remote user may interact with the remote web page 64 at step 80, after the local user and the remote user have established the chat communication channel 56 between themselves at step 72, without waiting for the local user to first interact with the local web page 62. In still another alternative embodiment, the collaborative chat session 50 may return to either step 74 or to step 80 after the action executed on the remote web page 64 has been replicated on the local web page 62, at step 94.

Figure 4:
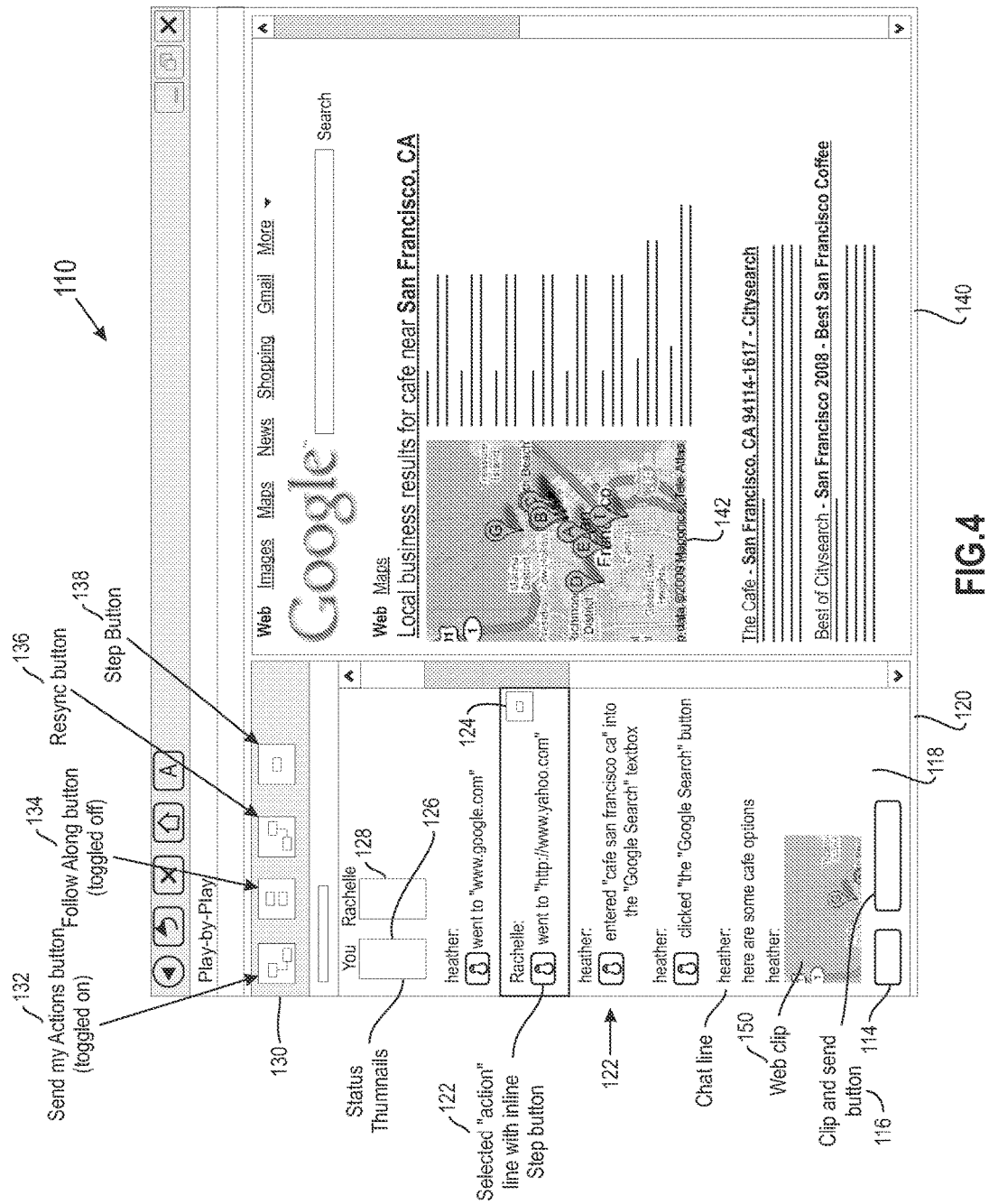
FIG. 4 is a diagrammatical illustration of a screen display including a user web page and chat page, in accordance with an exemplary embodiment of the present invention.

FIG. 4 is an illustration of an exemplary embodiment of a screen display 110 that can be used to facilitate the collaborative chat session 50 described in the flow diagram 70, above. The screen display 110 may comprise a chat page field 120 and a web browser field 140, the illustration here using a Mozilla Firefox® web browser as an example. The chat page field 120 may be configured as a sidebar, as shown, with a scrolling chat log 112 positioned above a text field 116 for entering new messages. A toolbar 130 may be provided at the top of the chat page field 120, the toolbar 130 including four buttons: a "Send My Actions" button 132, a "Follow Along" button 134, a "Resync" button 136, and a "Step" button 138. The "Send My Actions" button 132 and the "Follow Along" button 134 are preferably "toggles" that control the level of interaction between the collaborative chat stream and the web browser. A user may toggle the "Send My Actions" button 132 "on" whereby the user's web activity is automatically converted into human-readable textual descriptions and sent as messages in the chat stream.

If the "Follow Along" button 134 is toggled "on," additional recorded web actions, received in the chat stream from additional remote users, may be executed at the local user computer. If the local user does not want the additional recorded web actions to be executed automatically, a target chat line 122 can be selected corresponding to a particular web action, and the "Step" button 138 can be "pushed" to provide for manual execution of the corresponding recorded web actions. A duplicate "Step" button 124, having the same functions as the "Step" button 138 in the toolbar 130, may also be provided in the target chat line 122 for the convenience of the local user.

The "Resync" button 136 allows the local user to initiate re-synchronization with a remote user based on the actions recorded in the chat log 112. In an exemplary embodiment, the system 50 may include the macro recorder 28 which records a script of commands providing a return to a desired page accessed by the user, or other actions executed by the user. The local user may press the "Resync" button 136 to issue a "Resync" command. In response, the local user computer may be instructed to read through the chat log 112, to find the most recent action having the form "remote user went to 'http://somewebsite.com'." The local user computer may then execute the corresponding action and any subsequent actions from the remote user, providing that the remote user has been sharing all of the web activity since visiting the site "http://somewebsite.com."

One or more "status" thumbnails may be provided in the chat page field 120. In the example shown, a local user thumbnail 126 and a remote user thumbnail 128 are positioned below the toolbar 130. Each thumbnail image may be a graphic of the current browser page being accessed by the respective user in the chat session. The local user can pass a cursor over (i.e., "mouse over") a particular thumbnail image to bring up a larger image of the current browser page and the corresponding Uniform Resource Locator (URL) or web address. When the local user selects the local user thumbnail 126, for example, the action of selecting may toggle whether or not the local user is broadcasting an image of the current web page. When the user selects the remote user thumbnail 128, for example, the URL corresponding to the web page being accessed by the remote user may be displayed in the local user web browser field 140. Status thumbnails thus can provide awareness to the local user not only of where the remote users are during the collaborative chat session 50, but may also provide notice of when a remote user navigates to a new web page.

A "Clip and Send" button 116 may be provided in the chat page field 120 below the chat log 112. When the local user "presses" the "Clip and Send" button 116, for example, the local user can then select a portion of the web browser field 140 as a dynamic web clip 150. The local user can then use a "Send" button 114 to transmit the web clip 150 to some or all of the remote users. The dynamic web clip 150 may appear as an image in the chat log 112, as shown. As shown in the illustration, the local user copied the dynamic web clip 150 from a map image 142 in the web browser field 140. By double-clicking on or by otherwise selecting the dynamic web clip 150 in the chat stream, the remote user may open an HTML version of the dynamic web clip 150 in a new tab in the remote web browser.

The web clip 150 may be sent to other users as both an image and as a HTML/Cascading Style Sheets (HTML/CSS) clip. The images provide the receiving user with additional awareness of what the sending user is doing, and the HTML/CSS clip can be opened and used as a proxy substrate for viewing the actions of the sending user or demonstrating actions for the sending user to apply on the page from which the dynamic web clip 150 originated. Use of the dynamic web clip 150 thus assists the collaborative browsing process in two ways: 1) the dynamic web clip 150 allow the users to send explicit awareness cues that show not only the current page being viewed, but also the portion of the current page that the sending user considers to be most relevant; and 2) the dynamic web clip 150 provides a substrate on which the user receiving the dynamic web clip 150 can interact.

This latter functionality is especially important when only one of the users can access the web site or web session that is the subject of the collaboration. For example, if one user is purchasing a product from an e-commerce web site, the session associated with the checkout process can typically be accessed only on one computer. By clipping a piece of the process that providing a problem, other users can see the problem and propose a solution.

Figure 5:
FIG. 5 depicts a question box appearing over a web page text field associated with the web page of FIG. 4.

In another exemplary aspect of the present method, the remote user may have a question regarding information to be entered into a web page form 162, shown in FIG. 5, where the form 162 may include one or more form element, such as: a text field, a checkbox, or a radio button. The remote user can hover over, or "mouse over," the form element to make a "Question Mark" button 166 appear. The "Question Mark" button 166 can be selected, for example by clicking, to generate an appropriate question about what the remote user should or may enter in the corresponding text box. For example, placing a cursor 168 over the "Question Mark" button 166 that is on a text box for an address may generate a question in a question box 160 asking: "What should I enter in the address text box?" The question may then be sent to the local user or to another remote user.

Figure 6:
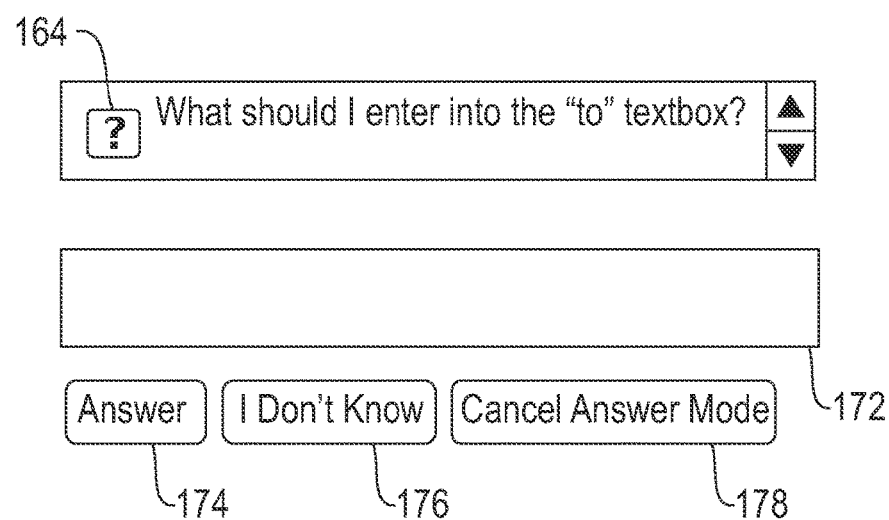
FIG. 6 depicts a text answer box obtained from the question box of FIG. 5.

The recipient of the question may then be switched into a "Question Mode" where the sender's question 164 appears with a text answer box 172, shown in FIG. 6. The recipient may then enter an answer into the text answer box 172 for transmittal to the sender via an "Answer" button 174. In an alternative exemplary embodiment, the target form element may be a check box or a radio button. A simple dictionary mapping can be provided to map the receiver's response to a "Yes" or a "No" value, and subsequently take an appropriate action. If the receiver does not know the answer to the question, a response of "I don't know" or one of several other similar phrases can be entered via an "I Don't Know" button 176. In an alternative exemplary embodiment, there may be provided a "Cancel Answer Mode" button 178 which the remote user can "click" to return to regular chatting.

Figure 7:
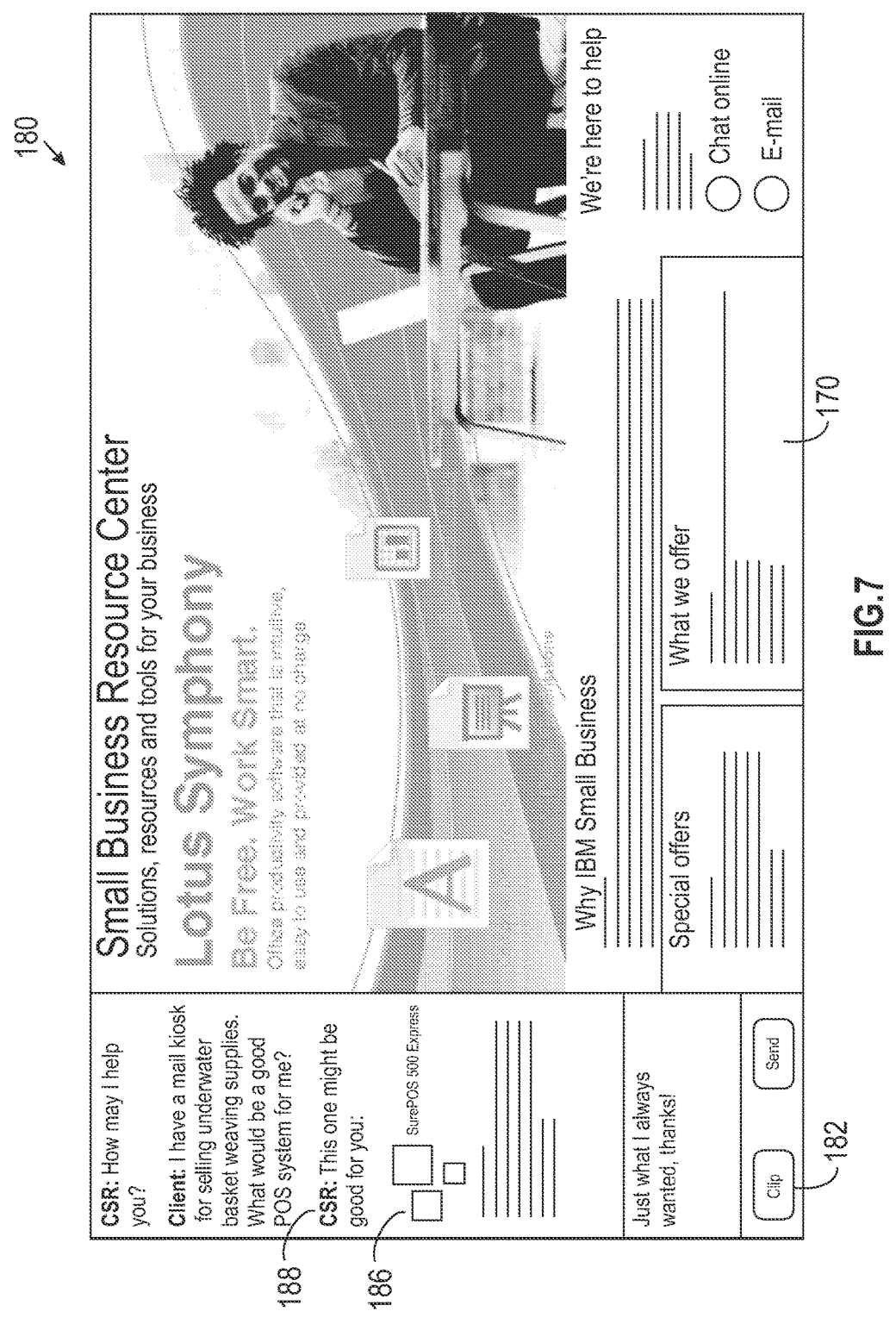

An alternative exemplary embodiment of a screen display 180 that can be used to facilitate the collaborative chat session 50, is shown in FIG. 7. The screen display 180 may include an IM client field 182 as part of a web browser to facilitate collaboration on browsing tasks. In the example provided, a customer (local user) is shopping on an "IBM.com" site 170, but would like to obtain certain advice from a customer support representative (remote user) using a "Chat Online" option via the IM client field 182. Using features in the screen display 180, the customer support representative may send a web clip 186 of a product offering as well as regular text 188. The client can then select options that look interesting and view them in a full web page.

It can be appreciated by one skilled in the art that, whereas a conventional instant message stream contains multiple static content items, such as text and images, a message stream in the collaborative chat session 50, described above, may also include clipped dynamic content, such as a portion of a web page, sent to another user via the instant messaging stream. The clipped dynamic content which appears in the chat stream may have a varying level of interactivity, specified by the sending user. In an exemplary embodiment, three such levels of interactivity may be specified. At a "Full Interactivity" level, for example, mouse and keyboard events and graphical changes can be exchanged between the local user and the remote user. The "Full Activity" level allows both users to see text as it is entered, to see when buttons are pressed and held down, and to see graphical changes in the clipped content as they occur.

At a "Medium Interactivity" level, events and graphical changes may be segmented by higher-level actions, such as actions initiated by the user. For example, if one user changes the text in a text box, the change might not appear graphically for the other user until the first user has completed most or all changes. The first user may provide the events and graphical changes to a second user by first queuing events performed or executed by the first user, and then sending some or all of the queued events to the second user in one or more transmittals via the asynchronous communication stream. At a "Low Interactivity" level, events may be queued up by one user, and then sent out all at once when the sending user initiates a transmittal action, such as by pressing a "Submit" button associated with the clipped content.

Moreover, by storing the interactions and changes to the clipped dynamic content in an IM chat stream, a user can subsequently review and understand previous clip interactions by accessing the IM chat history, even if the clipped dynamic content had not been previously seen by the user. That is, a history of the clip interactions can be stored, inspected, and played back at a later time for the user.

Advantageously, a user can select the method of segmenting interactive elements, such as events and graphical changes, within a chat session. The segmented events and segmented graphical changes may subsequently be added to the communication stream for transmittal to one or more other users. In one case, it may be best to clip a large screen region, to comprise the clipped dynamic content, and perform one or more interactions with that region before sending the clipped dynamic content (i.e., the large screen region) into the chat stream. In other cases it may be better to clip a small region, perform a simple interaction, clip another small region, and then perform another interaction. It can be appreciated that such segmentation is not possible using collaboration tools that support only totally synchronized interaction in real-time.

Figure 8:
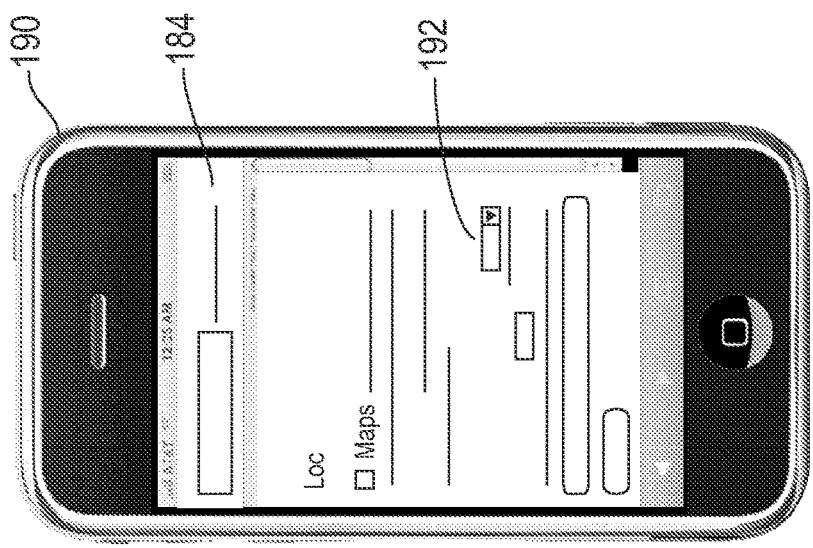

Application of the collaborative chat session 50 from the mobile user's perspective can be illustrated with reference to FIG. 8 in which a mobile communication device 190 displays a chat window 184. The chat window 184 may be similar to the chat page field 120 in the screen display 110 shown in FIG. 4, above. However, the chat window 184 may lack the toolbar 130 as the chat window 184 may be embedded within a web page and thus may not be able to control another web page. In addition, the status thumbnails 126 and 128 may not be provided in the chat window 184 because of space constraints and the lack of "mouse over" capabilities.

Figure 9:
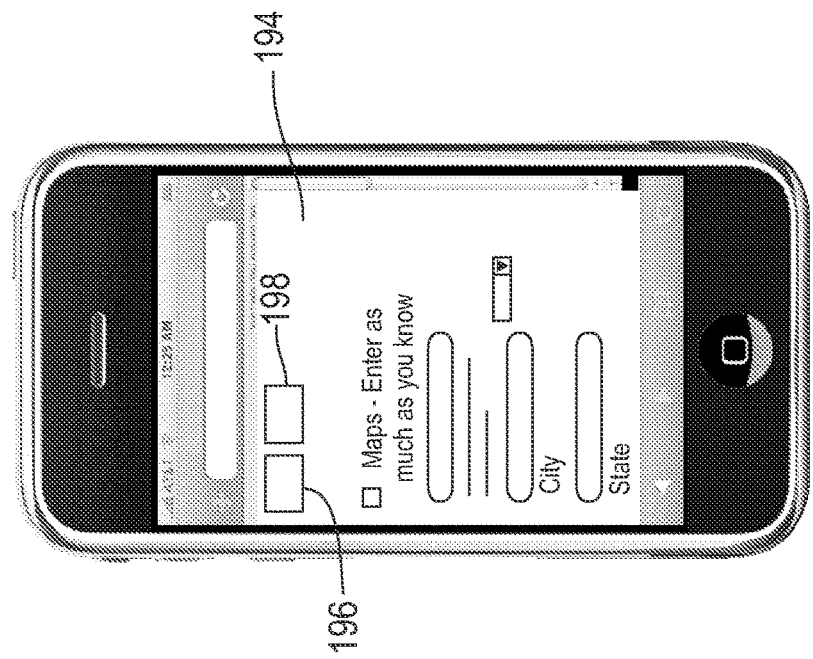
FIG. 9 depicts a web form obtained from the chat page of FIG. 8.

When the mobile user clicks on a clip 192 in the chat stream, the clip 192 may be opened in a browser window 194, shown in FIG. 9. The browser window 194 contains the HTML version of the clip 192 and may also include a "Send My Actions" button 196 and a "Follow Along" button 198. The buttons 196 and 198 may have the same respective functions as the buttons 132 and 134 in the toolbar 130 of the chat page field 120. In an exemplary embodiment, the design and screen size of the mobile communication device 190 may preclude more than one window from being visible at a time, thus preventing the user from seeing any new chat messages while viewing the clip 192. Accordingly, a "Back to Chat" button (not shown) may be provided to allow the mobile user to easily return to the chat window 184.

In one exemplary illustration of the present method, suppose that John is a new employee and is trying to learn how to navigate the company's intranet pages to perform necessary administrative tasks. One of these tasks is ordering business cards, and he asks Jane, a more senior employee, for assistance. Jane asks John to start a collaborative chat session with her. She then demonstrates how to order business cards by toggling "on" the sending of her actions, and then going through the necessary steps to order cards. John follows along and similarly executes each step performed by Jane with the exception of responding to one screen that asks for authentication. At this point, Jane toggles "off" the sending of her actions, enters her password, and then toggles "on" again once she has logged in to the system. Meanwhile John enters his own password when he has reached this point. He can then execute in his own account the action that Jane performs in her account, since the structure of both user pages are the same. When Jane has finished demonstrating the process, John renames the session to "Ordering Business Cards" and keeps as reference for the next time he needs to order business cards.

In another exemplary illustration of the present method, Hank is driving to a new restaurant to meet a friend, but he has forgotten to write down the address and remembers only the restaurant's unusual name. He calls his friend Liz, who happens to be at her computer, and asks her to search for the place and send him directions. She first goes to a search engine, clips the search page, and sends it to Hank. She then types in the restaurant name as she understood Hank to have spelled it out. Hank views the clip on his mobile communication device and sees that Liz has made a slight misspelling in the name. He corrects her over the phone, and she then performs the search using the correct name. Once Liz has found the address, she types it into a Map Application and obtains a link to a map for the location of the restaurant. She sends this link to Hank who clicks on this link in his browser. This action open a built-in Map Application to the linked map, and Hank obtains directions to the restaurant from his current location.

In yet another exemplary illustration of the present method, two friends are both planning to be in New York on business. They want to meet for dinner and begin a collaborative chat session to find a good restaurant. When something that looks interesting is found, a clip of the information is sent to the other person for consideration. When they are ready to make a decision, they scroll back through the chat history to review the options they have collected. Once they actually arrive in New York, they can also refer back to this chat session on their mobile communication devices if they do not remember which restaurant they decided on, or need to get back to the original website to obtain the address.

As will be appreciated by one skilled in the art, the present invention may be embodied as a system, a method or a computer program product. Accordingly, the present invention may take the form of an entirely hardware embodiment, an entirely software embodiment (including firmware, resident software, micro-code, etc.) or an embodiment combining software and hardware aspects. Furthermore, the present invention may take the form of a computer program product embodied in any tangible medium of expression having computer usable program code embodied in the medium. Any combination of one or more computer usable or computer readable medium(s) may be utilized.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

It should be understood, of course, that the foregoing relates to exemplary embodiments of the invention and that modifications may be made without departing from the spirit and scope of the invention as set forth in the following claims.

We claim:

1. A method comprising:
   establishing an asynchronous communication stream between a first computer of a first user and a second computer of a second user;
   sending user actions, performed by the first user on a first instance of an application displayed simultaneously on a web page in a first application window on the first computer, to the second user as the second user interacts with a second instance of the application in a second application window showing the web page displayed on the second computer;
   sending clipped dynamic content simultaneously with the sending user actions between the second computer and the first computer via said asynchronous communication stream, said clipped dynamic content having been selected and extracted from either the first or the second instance of the application; and
   adding said clipped dynamic content to an instant messaging chat stream between the first and second computer, wherein all the user actions performed by the first user and all user actions performed the second user are both simultaneously displayed on the first application window and the second application window.

2. The method of claim 1 further comprising opening said clipped dynamic content in the web page on the first computer.

3. The method of claim 2 further comprising interacting with said clipped dynamic content in said web page on said first computer.

4. The method of claim 3 further comprising sending to said second computer a textual description of said interaction with said clipped dynamic content.

5. The method of claim 1 wherein the first user actions are replicated in the second application window.

6. The method of claim 1 further comprising the first computer interacting with said clipped dynamic content prior to said step of sending said clipped dynamic content.

7. The method of claim 6 wherein said first computer interacting with said clipped dynamic content comprises changing text in a text box, said changed text not appearing graphically for said first user until said second user has completed changes to said text.

8. The method of claim 1 wherein sending said clipped dynamic content comprises:
   queuing second user events; and
   sending said second user events to said first user via said asynchronous communication stream.

9. The method of claim 1 wherein the first user interacts with the second user via a mobile communication device.

10. A computer-implemented method for asynchronous communication between a first user and a second user, comprising:
    establishing an asynchronous chat stream between the first user and the second user on a chat page;
    providing a web page to display with a first user computer and a second user computer;
    providing computer code to enable all user actions performed by the first user and all user actions performed by the second user to be simultaneously displayed on the first user computer and the second user computer;
    providing computer code to enable the first user to clip dynamic content using tools on the chat page from the web page, to send the clipped dynamic content to the second user and to display the clipped dynamic content simultaneously with the web page on the second computer based on a level of interactivity specified by the first user, wherein the specified level of interactivity controls an amount and type of actions, initiated by the first user, that are sent to the second user;
    providing computer code to enable sending, between the first user computer and the second user computer, the clipped dynamic content simultaneously with the sending of user actions; and
    sending a textual representation of web page interaction from the first user to the second user based on the specified level of interactivity.

11. The method of claim 10 further comprising:
    segmenting events and graphical changes made in the first user computer by higher-level actions; and
    adding said segmented events and said segmented graphical changes to said asynchronous chat stream.

12. The method of claim 10 further comprising providing an icon in a second user computer display, wherein clicking on said icon initiates said sending said clipped dynamic content to the second user computer.

13. The method of claim 12 wherein an action performed on said clipped dynamic content by said second user is replicated on the first user computer.

14. A computer system for providing collaborative communication between a first user and a second user, said computer system comprising:
    a server in asynchronous communication with a computer having an instant messaging module, said computer further having a macro recorder for recording a script of commands of actions performed by the first user on an application on a web page accessed by the first user, said computer further configured to display to the second user the script of commands performed by the first user, based on a level of interactivity specified by the first user that controls an amount and type of actions that are displayed to the second user, while the second user accesses the application on the web page in a chat window displayed to the second user; and a first communication device in communication with said server, said first communication device being capable of instant messaging communication with said computer via said server such that said computer can send via instant messaging said recorded script of commands to said first communication device, wherein the application includes a toggled command configured to automatically execute the commands performed by the first user in the application on a second communication device as the second user is interfaced with the application;

wherein the first communication device is configured to send clipped content to the second communication device simultaneously with the sending of user actions;

wherein all user actions performed by the first user and all user actions performed by the second user are both simultaneously displayed on the first communication device and the second communication device.

15. The computer system of claim 14 wherein the actions performed by the first user include clipping dynamic content of the application, including HyperText Markup Language code.

16. The computer system of claim 15 wherein said first communication device is configured to open and display said clipped dynamic content.

17. The computer system of claim 15 wherein said clipped dynamic content is selected and extracted using a software application having a capability to record, automate, and share among users processes performed in a web browser.

18. A method comprising:
providing an application to a first communication device accessed by a first user;
providing the application to a second communication device accessed by a second user;
providing to said first and said second communication devices a software application having a capability to record, automate, and share a first user's processes and a second user's processes performed in the application;
establishing an asynchronous communication chat stream between said first communication device and said second communication device, wherein execution of the first user's processes and execution of the second user's processes are simultaneously displayed on the first communication device and the second communication device;
wherein all user actions performed by the first user and all user actions performed by the second user are both simultaneously displayed on the first communication device and the second communication device;
wherein the first communication device and the second communication device are configured to send clipped content to each other simultaneously with the sending of user actions; and
providing a toggled command in the application configured to automatically execute the first user's processes in the application on the second communication device as the second user is interfaced with the application.

19. The method of claim 18 further comprising sending to the second user a textual description of the automatically executed first user's processes on second communication device to the second communication device.

20. The method of claim 19 wherein said textual description comprises one or more of a mouse event, a keyboard event, a dynamic clip extraction, and a graphical change to a computer system accessed by said first user.

21. The method of claim 19 further comprising the first communication device sending dynamic content clipped from the application displayed on the first communication device to said second communication device via said asynchronous communication stream.

* * * * *